United States Patent
Moll et al.

(10) Patent No.: US 7,131,020 B2
(45) Date of Patent: Oct. 31, 2006

(54) DISTRIBUTED COPIES OF CONFIGURATION INFORMATION USING TOKEN RING

(75) Inventors: Laurent Moll, Saratoga, CA (US); Joseph B. Rowlands, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 295 days.

(21) Appl. No.: 10/684,909

(22) Filed: Oct. 14, 2003

(65) Prior Publication Data

US 2005/0080941 A1   Apr. 14, 2005

(51) Int. Cl.
*G06F 15/16* (2006.01)
*G06F 13/00* (2006.01)

(52) U.S. Cl. ............... 713/375; 709/248; 709/249; 710/15; 710/17; 710/18; 710/19; 710/20

(58) Field of Classification Search .......... 709/201, 709/202, 205, 213–215, 217, 218, 220, 221, 709/248, 249; 710/15, 17–21; 713/100, 713/375
See application file for complete search history.

(56) References Cited

U.S. PATENT DOCUMENTS 5,452,424 A * 9/1995 Goeppel .................. 713/1
2003/0043836 A1 * 3/2003 Rashid et al. ............. 370/424

* cited by examiner

*Primary Examiner*—Tanh Q. Nguyen
(74) *Attorney, Agent, or Firm*—Bruce Garlick; Garlick, Harrison & Markison

(57) ABSTRACT

A system for synchronizing configuration information in a plurality of data processing devices using a common system interconnect bus. The present invention provides a method and apparatus for enforcing automatic updates to the configuration registers in various agents in the data processing system. A node controller is operably connected to a system interconnect bus and a switch. A plurality of interface agents are connected to the switch, with each of the interface agents comprising a configuration space register, a configuration space shadow register and a control and status register (CSR). A token ring connected to the node controller is operable to transmit data from the node controller to a plurality of interface agents connected to the token ring, thereby providing a system for updating the various configuration registers in each of the agents.

12 Claims, 2 Drawing Sheets

DISTRIBUTED COPIES OF CONFIGURATION INFORMATION USING TOKEN RING

RELATED APPLICATIONS

This application is related to U.S. Provisional Patent Application Ser. No. 60/380,740, filed May 15, 2002; U.S. Provisional Patent Application Ser. No. 60/331,789, filed Nov. 20, 2001; U.S. Provisional Patent Application Ser. No. 60/344,713, filed Dec. 24, 2001; U.S. Provisional Patent Application Ser. No. 60/348,777, filed Jan. 14, 2002, U.S. Provisional Patent Application Ser. No. 60/348,717, filed Jan. 14, 2002, U.S. patent application Ser. No. 10/270,016, filed Oct. 11, 2002 and U.S. patent application Ser. No. 10/269,666, filed Oct. 11, 2002, each of which is incorporated herein by reference in its entirety.

BACKGROUND OF THE INVENTION

1. Field of the Invention

The present invention is directed in general to data communications. More specifically, the present invention provides an improved method and apparatus for synchronizing information in multiple processing devices processing data connected detection of errors relating to transactions in high speed data processing systems.

2. Related Art

As is known, communication technologies that link electronic devices are many and varied, servicing communications via both physical media and wirelessly. Some communication technologies interface a pair of devices, other communication technologies interface small groups of devices, and still other communication technologies interface large groups of devices.

Examples of communication technologies that couple small groups of devices include buses within digital computers, e.g., PCI (peripheral component interface) bus, ISA (industry standard architecture) bus, USB (universal serial bus), and SPI (system packet interface). One relatively new communication technology for coupling relatively small groups of devices is the HyperTransport (HT) technology, previously known as the Lightning Data Transport technology (HyperTransport I/O Link Specification "HT Standard"). The HT Standard sets forth definitions for a high-speed, low-latency protocol that can interface with today's buses like AGP, PCI, SPI, 1394, USB 2.0, and 1 Gbit Ethernet as well as next generation buses including AGP 8x, Infiniband, PCI-X, PCI 3.0, and 10 Gbit Ethernet. HT interconnects provide high-speed data links between coupled devices. Most HT enabled devices include at least a pair of HT ports so that HT enabled devices may be daisy-chained. In an HT chain or fabric, each coupled device may communicate with each other coupled device using appropriate addressing and control. Examples of devices that may be HT chained include packet data routers, server computers, data storage devices, and other computer peripheral devices, among others.

In high speed data processing systems such as those described above, interface agents are required to respond to external and internal configuration accesses. Responding to these accesses requires these agents to provide a target for a request and to datapath to inject responses. In addition, in a multiport system with decentralized routing, there must be sharing of routing information between the agents. Using a switch to provide the aforementioned functionality would be very complicated. There is a need in the art, therefore, for an efficient method and apparatus for providing configuration status to multiple agents in a multiport system with decentralized routing.

SUMMARY OF THE INVENTION

The present invention provides a system for synchronizing configuration information in a plurality of data processing devices using a common system interconnect bus. More specifically, the present invention provides a method and apparatus for enforcing automatic updates to the configuration registers in various agents in the data processing system. The interface agent are not required to have target/response logic to respond to internal and external configuration accesses.

In and embodiment of the present invention, a node controller, which may comprise a configuration block, is operably connected to a system interconnect bus and a switch. A plurality of interface agents are connected to the switch, with each of the interface agents comprising a configuration space register, a configuration space shadow register and a control and status register (CSR). A token ring connected to the node controller is operable to transmit data from the node controller to a plurality of interface agents connected to the token ring, thereby providing a system for updating the various configuration registers in each of the agents. A transaction from an interface agent is transferred to the node controller which transfers the transaction onto the system interconnect bus. The transaction on the system interconnected bus is detected by the configuration block of the node controller and is then transmitted on the token ring to each of the agents connected thereto. The information transmitted on the token ring is used to update the information in the configuration space registers and configuration space shadow registers of each of the agents connected to the token ring. In an embodiment of the invention the interface agents are configured in accordance with the Hypertransport protocol. In this embodiment, the configuration comprises a HT configuration space register and the configuration space shadow register comprise a HT configuration space shadow register.

DETAILED DESCRIPTION

Figure 1:
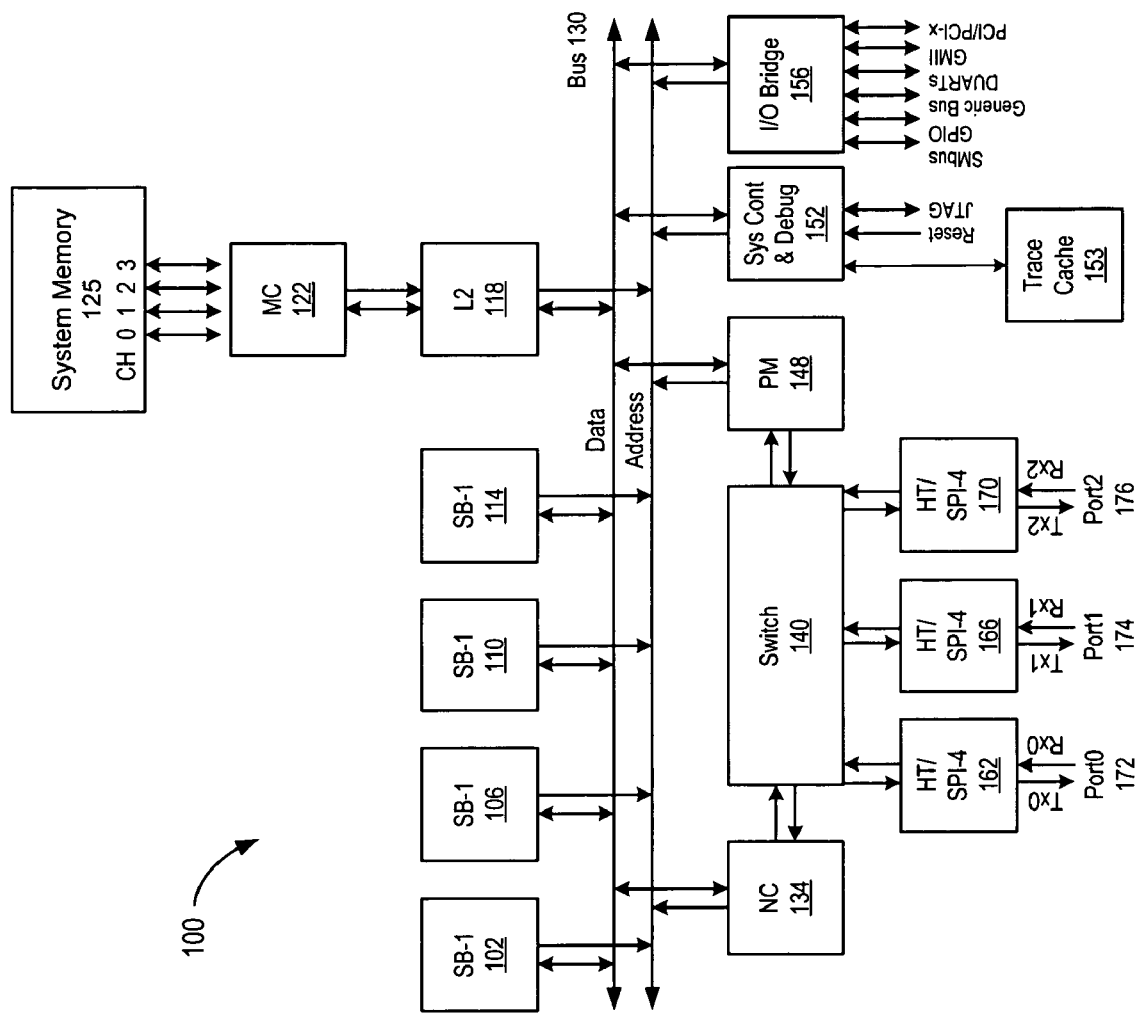
FIG. 1 shows a block diagram of a network multiprocessor switching system-on-a-chip.

A system level description of the operation of an embodiment of the multiprocessor switching system of the present invention is shown in FIG. 1 which depicts a schematic block diagram of a multiprocessor device 100 in accordance with the present invention. The multiprocessor device 100 may be an integrated circuit or it may be constructed from discrete components. The multiprocessor device 100 includes a plurality of processing units 102, 106, 110, 114, cache memory 118, memory controller 122, which interfaces with on and/or off-chip system memory 125, an internal bus 130, a node controller 134, a switching module 140, a packet manager 148, a system controller 152, an I/O Bridge 156 which interfaces the system bus various system interfaces, and a plurality of configurable packet based interfaces 162, 166, 170, such as three flexible HyperTransport/SPI-4 Phase 2 links.

As shown in FIG. 1, the four processors 102, 106, 110, 114 are joined to the internal bus 130. When implemented as standard MIPS64 cores, the processors 102, 106, 110, 114 have floating-point support, and are independent, allowing applications to be migrated from one processor to another if necessary. The processors 102, 106, 110, 114 may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture. The system 100 may include any number of processors (e.g., as few as one processor, two processors, four processors, etc.). In addition, each processing unit 102, 106, 110, 114 may include a memory sub-system (level 1 cache) of an instruction cache and a data cache and may support separately, or in combination, one or more processing functions.

The internal bus 130 may be any form of communication medium between the devices coupled to the bus. For example, the bus 130 may include shared buses, crossbar connections, point-to-point connections in a ring, star, or any other topology, meshes, cubes, etc. In selected embodiments, the internal bus 130 may be a split transaction bus (i.e., having separate address and data phases). The data phases of various transactions on the bus may proceed out of order with the address phases. The bus may also support coherency and thus may include a response phase to transmit coherency response information. The bus may employ a distributed arbitration scheme, and may be pipelined. The bus may employ any suitable signaling technique. For example, differential signaling may be used for high speed signal transmission. Other embodiments may employ any other signaling technique (e.g., TTL, CMOS, GTL, HSTL, etc.). Other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice. Furthermore, the bus may not be pipelined, if desired. In addition, the internal bus 130 may be a high-speed (e.g., 128-Gbit/s) 256 bit cache line wide split transaction cache coherent multiprocessor bus that couples the processing units 102, 106, 110, 114, cache memory 118, memory controller 122 (illustrated for architecture purposes as being connected through cache memory 118), node controller 134 and packet manager 148 together. The bus 130 may run in big-endian and little-endian modes, and may implement the standard MESI protocol to ensure coherency between the four CPUs, their level 1 caches, and the shared level 2 cache 118. In addition, the bus 130 may be implemented to support all on-chip peripherals, including the input/output bridge interface 156 for the generic bus, SMbus, UARTs, GPIO, Ethernet MAC and PCI/PCI-X interface. The cache memory 118 may function as an L2 cache for the processing units 102, 106, 110, 114, node controller 134 and/or packet manager 148.

The memory controller 122 provides an interface to system memory, which, when the multiprocessor device 100 is an integrated circuit, may be off-chip and/or on-chip. The memory controller 122 is configured to access the system memory in response to read and write commands received on the bus 130. The L2 cache 118 may be coupled to the bus 130 for caching various blocks from the system memory for more rapid access by agents coupled to the bus 130. In such embodiments, the memory controller 122 may receive a hit signal from the L2 cache 118, and if a hit is detected in the L2 cache for a given read/write command, the memory controller 122 may not respond to that command. Generally, a read command causes a transfer of data from the system memory (although some read commands may be serviced from a cache such as an L2 cache or a cache in the processors 102, 106, 110, 114) and a write command causes a transfer of data to the system memory (although some write commands may be serviced in a cache, similar to reads). The memory controller 122 may be designed to access any of a variety of types of memory. For example, the memory controller 122 may be designed for synchronous dynamic random access memory (SDRAM), and more particularly double data rate (DDR) SDRAM. Alternatively, the memory controller 122 may be designed for DRAM, DDR synchronous graphics RAM (SGRAM), DDR fast cycle RAM (FCRAM), DDR-II SDRAM, Rambus DRAM (RDRAM), SRAM, or any other suitable memory device or combinations of the above mentioned memory devices.

The node controller 134 functions as a bridge between the internal bus 130 and the configurable packet-based interfaces 162, 166, 170. Accordingly, accesses originated on either side of the node controller will be translated and sent on to the other. The node controller also supports the distributed shared memory model associated with the cache coherency non-uniform memory access (CC-NUMA) protocol.

The packet manager 148 circuitry communicates packets between the interfaces 162, 166, 170 and the system memory, and may be a direct memory access (DMA) engine that writes packets received from the switching module 140 into input queues of the system memory and reads packets from output queues of the system memory to the appropriate configurable packet-based interface 162, 166, 170. The packet manager 148 may include a packet manager input and a packet manager output, each having its own DMA engine and associated cache memory. The cache memory may be arranged as first-in-first-out (FIFO) buffers that respectively support the input queues and output queues.

The packet manager circuit 148 comprises circuitry shared by the interfaces 162, 166, 170. The packet manager may generate write commands to the memory controller 122 to write received packets to the system memory, and may generate read commands to read packets from the system memory for transmission by one of the interfaces 162, 166, 170. In some embodiments, the packet manager 148 may be a more efficient use of hardware than having individual DMA engines for each of the interfaces 162, 166, 170. Additionally, the packet manager may simplify communication on the bus 130, in some embodiments, for packet data transfers. It is noted that, in some embodiments, the system 100 may include an L2 cache coupled to the bus 130. The packet manager 148 may be configured, in some embodiments, to cause a portion of the packet data to be stored into the L2 cache in addition to being stored in memory. In some embodiments, the packet manager 148 may use descriptors to locate the memory locations for reading and writing packet data. The descriptors may be stored in the L2 cache or in main memory. The packet manager 148 may read and write the descriptors as well.

In some embodiments, the interfaces 162, 166, 170 may have dedicated communication paths to the node controller 134 or packet manager 148. However, in the illustrated embodiment, the system 100 employs a switch 140. The switch 140 may selectively couple one of the receive/ transmit interfaces 162, 166, 170 to the node controller 134 or packet manager 148 to transfer received data. The switch 140 may selectively couple the packet manager 148 to one of the interfaces 162, 166, 170 to transfer packet data from the packet manager 148 to the interfaces 162, 166, 170 for transmission on the corresponding ports 172, 174, 176. The switch 140 may have request/grant interfaces to each of the interfaces 162, 166, 170 and the packet manager 148 for requesting transfers and granting those transfers. As will be appreciated, a receive/transmit interface includes any circuitry configured to communicate on a port according to the protocol defined for the port. The interface may include receive circuitry configured to receive communications on the port and to transmit the received communications to other circuitry internal to the system that includes the interface. The interface may also include transmit circuitry configured to receive communications from the other circuitry internal to the system and configured to transmit the communications on the port. The switching module 140 functions to direct data traffic, which may be in a generic format, between the node controller 134 and the configurable packet-based interfaces 162, 166, 170 and between the packet manager 148 and the configurable packet-based interfaces. The generic format may include 8 byte data words or 16 byte data words formatted in accordance with a proprietary protocol, in accordance with asynchronous transfer mode (ATM) cells, in accordance with internet protocol (IP) packets, in accordance with transmission control protocol/internet protocol (TCP/IP) packets, and/or in general, in accordance with any packet-switched protocol or circuit-switched protocol. In a selected embodiment, a 256-Gbit/s switch 140 connects the on-chip memory 118 and processors 102, 106, 110, 114 to the three HyperTransport/SPI-4 links 162, 166, 170, and provides transparent forwarding of network, ccNUMA access, and HyperTransport packets when necessary.

The configurable packet-based interfaces 162, 166, 170 generally function to convert data from a high-speed communication protocol (e.g., HT, SPI, etc.) utilized between multiprocessor devices 100 and the generic format of data within the multiprocessor devices 100. Accordingly, the configurable packet-based interface 162, 166, 170 may convert received HT or SPI packets into the generic format packets or data words for processing within the multiprocessor device 100, such as by using a receiver interface (which amplifies and time aligns the data received via the physical link and then converts the received protocol-formatted data into data from a plurality of virtual channels having the generic format), hash and route block and receiver buffer for holding the data until a routing decision is made. Packets arriving through receiver interface(s) of the chip can be decoded in either SPI-4 mode (native packet mode) or in HyperTransport (HT) mode, in which case, it uses a special extension called Packet-over-HT (PoHT) to transfer the packets. From a logical perspective, both modes provide almost identical services. In addition, the configurable packet-based interfaces 162, 166, 170 may convert outbound (transmit) data of a plurality of virtual channels in the generic format received from the switching module 140 into HT packets or SPI packets, such as by using a transmitter formatter and transmitter interface, which take the incoming packet data chunks from the switch and format them according to the mode it is configured in, and then drive the high-speed formatted stream of data onto the physical link coupling the present multiprocessor device 100 to another multiprocessor device. The particular conversion of packets to generic formatted data performed by the configurable packet-based interfaces 162, 166, 170 is based on configuration information, which, for example, indicates configuration for HT to generic format conversion or SPI to generic format conversion.

The system controller 152 is coupled to provide interrupts to the interrupt lines in processors 102, 106, 110, 114 and is further coupled to receive interrupt requests from system modules (such as packet manager 152 or packet-based interfaces 162, 166, 170 illustrated in FIG. 1) and from other devices within the system 100 (not shown). In an alternative embodiment described herein, the interrupt mapping function may instead or in addition be provided in the various system modules that generate interrupts, such as the packet manager 152 or packet-based interfaces 162, 166, 170 illustrated in FIG. 1. The system controller 152 may map each interrupt to one of the interrupt lines of processors 102, 106, 110, 114, and may assert an interrupt signal to the selected processor 102, 106, 110, 114. The processors 102, 106, 110, 114 may access the system controller 152 to determine the source of a given interrupt. The system controller 152 may employ any mapping mechanism. In one embodiment, the system controller 152 may comprise a channel register and a source register to map each interrupt request to each processor 102, 106, 110, 114. The channel register identifies to the processor which channels are generating interrupts, and the source register indicates the real source of a channel's interrupt. By using a programmable interrupt controller in the packet manager with interrupt channel and source information stored in configuration status registers, the interrupt mapper can mask events and vector interrupts to their final destination using at most two CSR read operations by the processor, although additional mapping can be done in the system controller 152.

In one embodiment, the interfaces 162, 166, 170 may support a set of virtual channels (VCs) in which packets are transmitted. A virtual channel corresponds to the notion of "port" in the SPI-4 specification, and may be used to provide virtual independent flow of packets. The VC is "virtual" in that all the datapaths, including at the I/Os, are provided through a single physical channel, for example by time-multiplexing multiple flows through a single physical channel. Each virtual channel is defined to flow independently of the other virtual channels, even though the virtual channels may share certain physical resources (e.g., the port 172, 174, 176 on which the packets are flowing). These virtual channels may be mapped to internal virtual channels (also referred to as output virtual channels). The datapaths of the high-speed ports 162, 166, 170, the switch 140, and the packet manager 148 all support virtual channels. That is, the switch may grant a coupling between a source and a destination based not only on the ability of the source to transfer data and the destination to receive data, but also on the ability of the source to transfer data in a particular output virtual channel and the destination to receive data on that output virtual channel. Thus, requests from sources may indicate the destination and the virtual channel on which data is to be transferred, and requests from destinations may indicate the virtual channel on which data may be received. Additionally, in some embodiments, the switch 140 may merge inputs to a given destination virtual channel on a packet boundary. That is, if two sources are requesting to transfer packet data to the same destination and virtual channel, and one of the sources has been granted to that destination and virtual channel, the switch inhibits granting to the other source for that destination and virtual channel until the current source reaches a packet boundary.

In one embodiment, the system 100 (and more particularly the processors 102, 106, etc., the memory controller 122, the interfaces 162, 166, etc., the node controller 134, the packet manager 148, the switch 140, the system controller 152 and the bus 130) may be integrated onto a single integrated circuit as a system on a chip configuration. Additional circuitry (such as PCI interfaces, serial interfaces, Personal Computer Memory Card International Association (PCMCIA) interfaces, etc.) may also be integrated. Alternatively, other embodiments may implement one or more of the devices as separate integrated circuits. In another configuration, the system memory may be integrated as well. Alternatively, one or more of the components may be implemented as separate integrated circuits, or all components may be separate integrated circuits, as desired. Any level of integration may be used. The system 100 may be designed to take advantage of the integration by tightly coupling the components to provide high performance packet processing. Specifically, the processors 102, 106, etc., the L2 cache 118, the memory controller 122, node controller 134, system bus 130 and the packet interface circuits 162, 166, 170 may be tightly coupled to receive, process, and forward data (if necessary).

As will be understood, the multiprocessor device 100 of the present invention provides multiprocessing functionality on its own which makes it suitable for scientific and embedded applications requiring significant computational capabilities. In a selected embodiment, the multiprocessor device 100 of the present invention contains a number of peripherals along with its sophisticated memory and communication support. For example, in a selected embodiment, the processor cores (e.g., 102) are 0.8 to 1.2-GHz, 64-bit MIPS with 64 kbytes of level one cache memory per processor and 1 Mbyte of level two cache 118 per chip; an 800-MHz DDR controller 122; off-chip ccNUMA support and optional ECC support. Three 8/16-bit receive/transmit ports 162, 166, 170 are also provided that are configurable as either HyperTransport or SPI-4 links. Additional peripheral features include an input/output bridge 156 that includes a 10/100/1000 Ethernet MAC interface, general-purpose I/O ports, SMBus serial interfaces, four DUARTs and a 32-bit 33/66-MHz PCI or 64-bit 133 MHz PCI/x interface.

In addition to providing stand alone computational functions, the multiprocessor devices 100 may also be used in communication-oriented applications that need significant computational support, like an array of HyperTransport linked chips for use with Internet service routers and switches with deep content switching and differentiated services such as quality-of-service (QoS) and virtual private networks (VPNs). The multiprocessor devices 100 may also be used in Internet-Protocol (IP) servers and subscriber-management platforms, servers supporting high computational requirements for scientific or Enterprise Java environments, and wireless infrastructure equipment. With three ports 172, 174, 176 on the chip, up to eight chips can be connected via the HyperTransport links in a "cube" configuration of nodes, for a 32-processor system.

When used in a HyperTransport linked network, the multiprocessor devices 100 provide a highly integrated nonuniform memory access (NUMA) architecture with low power consumption that multiplexes memory and I/O traffic on the same link. In contrast to conventional symmetrical multiprocessing systems (where all processors have the same memory access time and a bus or switch acts as an interface between processors and the memory subsystem so that cache coherence is maintained by monitoring the bus or the switch traffic), with NUMA, the memory address space is made up of the combined local memory (e.g., system memory 125) from each node in the system. A processor can access its local memory faster than nonlocal memory. NUMA systems have the advantage of being easily expanded, while adding a processor to a conventional SMP shared memory architecture is more difficult because an additional port is needed.

By using a cache-coherent form of NUMA (ccNUMA), on-chip caches can remain up to date even while data moves through the processor/memory interconnect. The on-chip double-data-rate (DDR) memory controller 122 supports the chip's local, off-chip memory, and its HyperTransport links 162, 166, 170 provide ccNUMA support.

Figure 2:
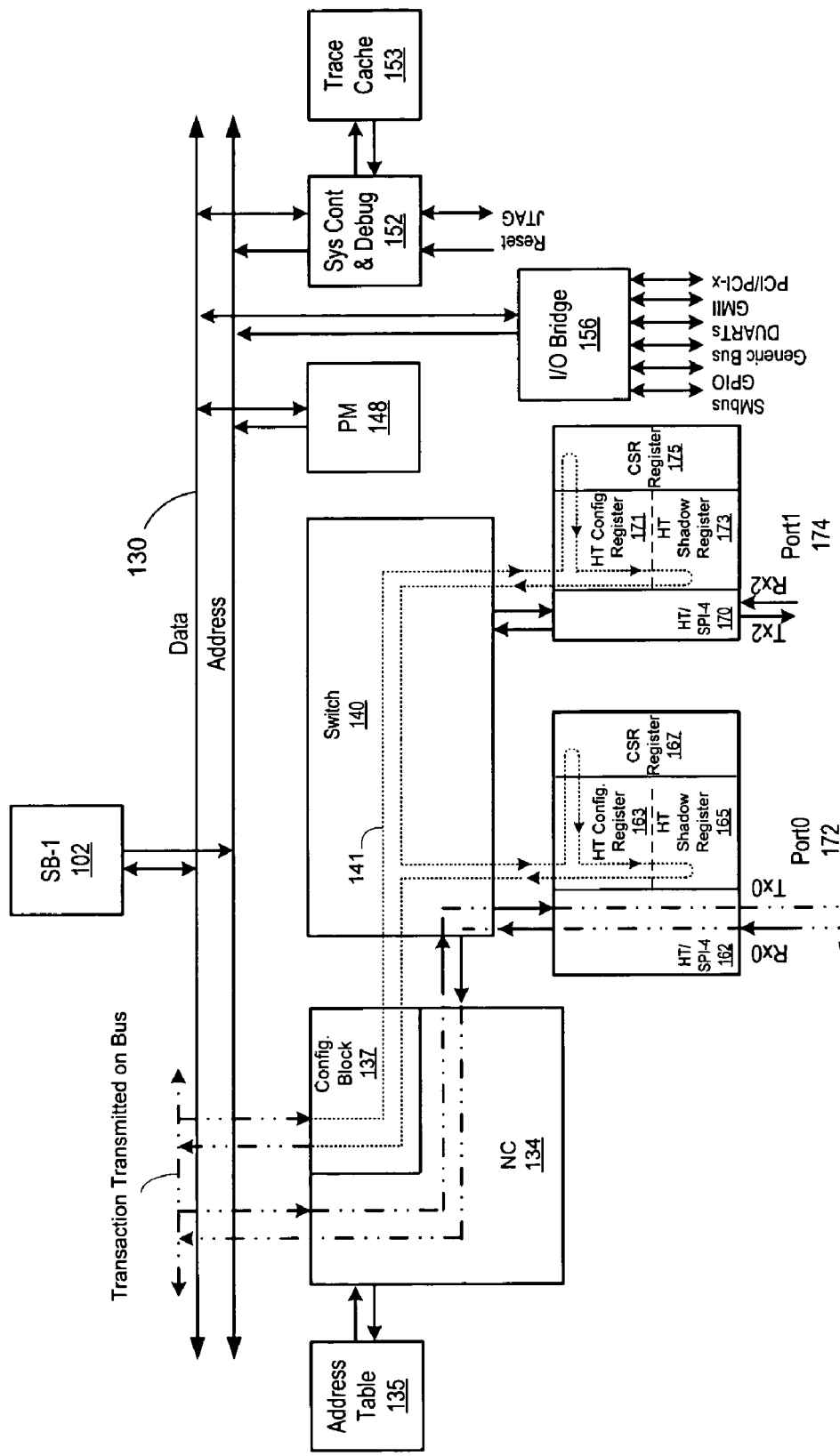
FIG. 2 is a block diagram of system components for implementing the data synchronization method and apparatus of the present invention.

Referring to FIG. 2, it can be seen that each of the interface agents 162 and 170 comprise HT configuration space registers, HT configuration space shadow registers and control and status registers (CSRs). For example, Agent 162 comprises HT configuration space register 163, HT configuration space shadow register 165 and CSR register 167. Agent 170 comprises HT configuration space register 171, HT configuration space shadow register 173 and CSR register 175.

For information to be routed correctly through the system, it is important for the various agents to have local copies of certain routing and addressing information relating to other agents in the system. Information pertaining to a particular agent is maintained in its own configuration space registers, such as the HT configuration space register 163 and the CSR register 167 of agent 162 and the corresponding registers in agent 170. Information relating to other HT agents in the system is maintained in the HT configuration space shadow register 165 of agent 162 and HT configuration space shadow register 173 of agent 170.

In the system of the present invention, configuration space registers pertaining to all functions (headers) and capability blocks implemented by the system are controlled by the node controller 134. The node controller 134 either has a copy of the registers or the access to a register is routed through node controller in a serial manner. In either of these cases, reads and writes to configuration spaces throughout the various system components pass through the node controller 134. The node controller 134 enforces ordering rules that are similar to non-posted commands from an ordering standpoint.

Instead of issuing transactions on the I/O bus 130, configuration space register accesses are issued on a dedicated token ring illustrated by reference numeral 141. The token ring 141 is connected to all agents within the system that have configuration registers. A transaction issued on the token ring 141 is seen by every agent attached to the token ring 141, but only targeted agents will respond to a transaction issued on the token ring. Agents that are not targeted simply pass the transaction along to the next agent. There can be more than one target agent for each transaction issued, however, there should be at least one target agent corresponding to every transaction.

The token ring 141 begins and ends at the configuration block 137 of node controller 134. Therefore, the node controller 134 is aware of whether a transaction has been seen by all of the target agents on the token ring 141. The target agents themselves are not allowed to reorder accesses to configuration registers.

The method and apparatus of the present invention can be used with numerous types of transactions, including reads and writes to memory, commands and I/O transactions. The updating of the information contained in the HT configuration space shadow registers can be initiated by an agent executing a "snoop" on the token ring, whereby the agent obtains needed data as is passes by on the token ring. For CSRs, there is a single owner for reads and writes. For a configuration read, only the default owner responds to the transaction. Configuration reads and writes require "completion," which can be the "response" in the case of a configuration read, and a "write done" message in the case of a configuration write. As will be understood by those of skill in the art, once a transaction has traversed the token ring back to the node controller 134, it is "completed." At that point, all of the necessary registers, either configuration or shadow registers, are guaranteed to be updated.

As will be understood by those of skill in the art, transactions are "seen" by the agents in the order they were received on the token ring 141. A completion message is sent to the originator of the transaction when the transaction has traversed the entire token ring and has been "seen" by all of the agents. The ordering rules followed as described herein and the serial propagation of data throughout the system complies with the HT protocol requirements.

For "debug" purposes, the shadow registers can be read independently to verify that the data contained therein is synchronized with the corresponding data in the configuration registers of the other agents.

Referring again to FIG. 2, an HT remote access is received at agent 162 and is routed to the switch 140. It is then routed through the node controller 134 where it is transferred to the bus 130. The transaction is transmitted on the bus 130 and is detected on the configuration block 137 of the node controller. The transaction is then transmitted on the token ring 141 to each of the HT agents in the system. As it passes through the HT agents, the HT configuration space registers and the HT configuration space shadow registers of the HT agents are updated with configuration information relating to the transaction in progress and the state of the other HT agents in the system.

The updating of configuration registers using the token ring 141 has a number of advantages. The token ring 141 passes through every agent in the system. Therefore, duplication of state is easily achieved. Using the token ring 141, ordering of configuration accesses is easily maintained. The token ring also requires fewer routing resources than point to point connections.

The method and apparatus of the present invention is also useful to implementing internal accesses, such as an access from a processor 102 on the bus 130. In prior art systems, a configuration request sent by a processor on the bus 130 targeting an agent would go to the agent through the main datapath, i.e., the switch fabric, and dedicated target/response logic would be used to handle the access request. Therefore, prior art systems needed target/response logic for both externally and internally generated configuration accesses. In the present invention, there is no material difference between an external and an internal access request. Thus the access request from the processor 102 will be detected by the node controller and routed on the token ring 141 in the same manner as an external request is routed.

While the system and method of the present invention has been described in connection with the preferred embodiment, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A system for synchronizing configuration information in a plurality of data processing devices, comprising:
    a node controller;
    a plurality of interface agents operably connected to said node controller, said interface agents operating in accordance with the hypertransport (HT) protocol, wherein each of said agents comprises a plurality of configuration registers, including an HT configuration space register and an HT configuration space shadow register; and
    a token ring connecting said node controller and said plurality of interface agents;
    wherein a transaction from an interface agents is directed to said node controller and said node controller transmits information to each agent using said token ring, wherein said information transmitted on said token ring is used by said agents to update said configuration space registers.

2. The system of claim 1, wherein said transaction comprises an input/output transaction.

3. The system of claim 1, wherein said transaction comprises a control command.

4. The system of claim 1, wherein said transaction comprises a write to a memory addresses.

5. The system of claim 1, wherein said transaction comprises a read from a memory addresses.

6. The system of claim 1, wherein information stored in the HT configuration space shadow register of an agent is updated by a snoop on said token ring executed by said agent.

7. A system for synchronizing configuration information in a plurality of data processing devices using a common system interconnect bus, comprising:
    a node controller operably connected to said system interconnect bus, wherein said node controller comprises a configuration block and transactions are detected by said configuration block;
    a plurality of interface agents operably connected to said node controller, said interface agents operating in accordance with the hypertransport (HT) protocol, wherein each of said agents comprises a plurality of configuration registers, including an HT configuration space register and an HT configuration space shadow register; and
    a token ring connecting said node controller and said plurality of interface agents, wherein said token ring is connected to said configuration block of said node controller;
    wherein a transaction from an interface agents is directed to said node controller and said node controller:
    detects said transaction;
    transfers said transaction to said system interconnect bus; and
    transmits information to said agents using said to said token ring, wherein said information transmitted on said token ring is used by said agents to update said configuration space registers.

8. The system of claim 7, wherein said transaction comprises an input/output transaction.

9. The system of claim 7, wherein said transaction comprises a control command.

10. The system of claim 7, wherein said transaction comprises a write to a memory addresses.

11. The system of claim 7, wherein said transaction comprises a read from a memory addresses.

12. The system of claim 7, wherein information stored in the HT configuration space shadow register of an agent is updated by a snoop on said token ring executed by said agent.

* * * * *